United States Patent [19]

Iwamoto et al.

[11] Patent Number: 5,479,655
[45] Date of Patent: Dec. 26, 1995

[54] METHOD AND SYSTEM FOR USE IN AN ON-LINE DATABASE SYSTEM FOR DYNAMICALLY EXPANDING A FILE WITHOUT SUPPRESSION OF JOB EXECUTION

[75] Inventors: Kouji Iwamoto, Yokohama; Kota Yamaguchi, Yamato; Yasushi Murakata, Yokohama, all of Japan

[73] Assignees: Hitachi, Ltd., Tokyo; Hitachi Software Engineering Co., Ltd., Yokohama, both of Japan

[21] Appl. No.: 857,657

[22] Filed: Mar. 26, 1992

[30] Foreign Application Priority Data

Mar. 28, 1991 [JP] Japan ..................... 3-064352

[51] Int. Cl.⁶ .................... G06F 12/04; G06F 13/00
[52] U.S. Cl. ................ 395/600; 395/822; 395/845; 395/281; 395/375; 364/DIG. 1; 364/245.1; 364/245.31; 364/282.2
[58] Field of Search ................... 395/400, 425, 395/375, 600, 325, 822, 845, 281; 371/12; 364/DIG. 1

[56] References Cited

U.S. PATENT DOCUMENTS

| | | | |
|---|---|---|---|
| 4,020,466 | 4/1977 | Cordi | 395/600 |
| 4,189,773 | 2/1980 | O'Meara | 395/375 |
| 4,258,418 | 3/1981 | Heath | 395/250 |
| 4,445,170 | 4/1984 | Hughes | 395/400 |
| 5,226,141 | 7/1993 | Ebenson | 395/425 |

FOREIGN PATENT DOCUMENTS 261732  3/1990  Japan .

*Primary Examiner*—Thomas G. Black
*Assistant Examiner*—Jean R. Homere
*Attorney, Agent, or Firm*—Antonelli, Terry, Stout & Kraus

[57] ABSTRACT

A dynamic file expansion method and system for on-line database systems is provided. When an empty space of a file becomes insufficient, the file is dynamically expanded asynchronously with a record input/output process relative to an already existing space, by using another process while continuing the record input/output process. Jobs are not therefore intercepted and adversely affected by insufficient empty space of the file. In the structure of the method and system, a file expansion timing detecting section monitors the remaining empty space of a file with the help of a record input/output processing section. When the remaining empty space becomes equal to or less than a predetermined space registered in a file expansion information registering section, a dynamic file expansion is requested to an asynchronous file expanding section. The asynchronous file expanding section generates new space management information using a process different from the process executed by the record input/output processing section, to execute a space expanding process and an expanded space initializing process.

5 Claims, 14 Drawing Sheets

FILE EXPANSION COMPLETION DETECTING SECTION 6

DYNAMIC FILE INFORMATION
INTEGRATING SECTION 8

FILE EXPANSION COMPLETION DETECTING SECTION 3

FIG. 8 — FILE EXPANSION TIMING DETECTING SECTION 3

ASYNCHRONOUS FILE EXPANDING SECTION 4

FILE EXPANSION HISTORY RETRIEVING SECTION 5

FILE EXPANSION INHIBITTING SECTION 9

EXPANDED FILE RECOVERING SECTION 11

METHOD AND SYSTEM FOR USE IN AN ON-LINE DATABASE SYSTEM FOR DYNAMICALLY EXPANDING A FILE WITHOUT SUPPRESSION OF JOB EXECUTION

BACKGROUND OF THE INVENTION

The present invention relates to a dynamic file expansion method and system for information management systems of the type that the total amount of data in a file and the amount of expected data increase during a unit time period cannot be estimated beforehand, particularly for on-line database systems in which storage and reference of a great amount of data is executed by a plurality of database systems.

When the space of a file becomes insufficient due to repetitive data storage such as data addition and insertion, a file management system informs an application program of an insufficient file space error so that the job executed by the application program is intercepted. The file manager disconnects the file from on-line jobs to expand and reallocate the space and thereafter store data again, or to provide additional space allocation. Such file expansion requires interception of on-line jobs. It is therefore necessary to always monitor the use state of a file and estimate the amount of expected data increase, to accordingly expand the file space at a proper time, such as at night. Such management is cumbersome and requires a large amount of labor. Furthermore, due to service time needed for on-line jobs being provided in the night and on holidays, it is not always possible to perform file expansion.

In a known method, a file management system automatically expands a file by a predetermined amount when the empty space of the file becomes insufficient or before it becomes insufficient. For example, according to a method proposed in JP-A-2-61732, a threshold value of a file use factor and a medium name to be automatically expanded are registered in advance to thereby automatically provide an additional space when the file is used in excess of the threshold value. More specifically, file expansion without intercepting on-line jobs is realized by provision of means for automatically supervising the use state of the file and automatically expanding the file when the file is used in excess of the threshold value a file use factor set at the time of file allocation, or by provision of means for dynamically inquiring a need of file expansion and means for dynamically instructing file expansion.

With such a conventional approach, a record input/output processing for a file is performed while referring to file space management information stored in a memory. Therefore, during the file expansion which causes the space management information to change, all record input/output processing for the file is stopped. The wait state of the jobs using this file occurs temporarily during the file expansion, lowering the on-line response.

There is another approach of allocating an additional file and handles a plurality of files as a single logical file. With this approach, it is possible to allocate an additional file while continuing record input/output processing by using already existing files. However, the number of physical files increases each time file expansion is performed. The memory capacity used for management of files and the number of file open processes therefore increase, leading to complicated file management. Furthermore, if file expansion is performed basing upon a record store instruction or file expansion instruction in the course of executing an application program, an overhead of the file expansion is added to the job execution process, lowering the response of the job.

Apart from the above, if timings for file expansion are judged from a threshold value of a file use factor, the following problems arise.

Namely, although the total file space increases by file expansion, if an allocated expansion space is small relative to the empty space left at the time when the file is used up to the threshold value, timings for starting file expansion become faster the more the file expansion is performed, occupying wasteful space generated by the file expansion otherwise unnecessary. On the contrary, if an allocated expansion space is large relative to the empty space remaining at the time when the file is used up to the threshold value, there is an ample possibility of using entirely the remaining empty space before completion of the file expansion.

If a file is shared by a plurality of file management systems, the following problems occur.

Namely, space management information of the file expanded by a certain management system contradicts with that of another file management system. In this case, records within the expanded space cannot be accessed, or the already expanded file is again expanded unnecessarily.

If there is some failure of a dynamically expanded file or dynamic file expansion process itself, the following problems occur.

Namely, a file management system is generally provided with a file recovery means for recovering a file by inputting history (journal) information containing the later renewal, addition, and deletion of records, to a file backup copy, and reproducing time sequentially the renewal, addition, and deletion of the records. It is also necessary to recover a file which underwent dynamic file expansion, by using a similar file recovery means. Furthermore, if the whole space of a file is made unusable when some failure occurs while expanding the file, jobs using the space before the file expansion are stopped.

SUMMARY OF THE INVENTION

It is an object of the present invention to provide a method and system capable of dynamically expanding a file without interception of job execution.

It is another object of the present invention to provide a method and system for use in on-line database systems, capable of dynamically expanding a file while continuing job execution without adversely affecting it.

It is a further object of the present invention to provide a method and system for use in on-line database systems, capable of dynamically expanding a file while retaining an optimum allocation space efficiency of a data store medium.

It is a still further object of the present invention to provide a method and system for use in on-line database systems, capable of dynamically expanding a file shared by a plurality of file management systems without any conflict between the systems.

It is another object of the present invention provide a method and system for use in on-line database systems, allowing file recovery and job degradation when a failure of a dynamically expanded file or dynamic file expansion itself occurs.

It is a further object of the present invention to provide a method and system, capable of eliminating a need of correct estimation of the total necessary space of a file when executing a store process for storing a great amount of data in the file, a reloading process of data in the file, or a file move process.

According to one aspect of the present invention, a dynamic file expansion system comprises:

file expansion information registering means for registering information of an allocated expansion space which is added to a file in the case of insufficient space of the file, and a remaining empty space of the file at which an expansion timing is set;

file expansion timing detecting means for detecting that the actual remaining space of the file becomes equal to or less than the registered remaining empty space at which the expansion timing is set to issue a file expansion request;

asynchronous file expanding means responsive to the file expansion request issued from the file expansion timing detecting means, for forming and storing in a space management information store memory, new space management information in accordance with the registered allocated expansion space information, and executing a space expanding process and an initializing process to the file, in parallel with continuing a record input/output process relative to the already existing space before the space expansion;

record input/output processing means for executing the record input/output process relative to the already existing space by using old before-expansion space management information; and file expansion information informing means for informing the record input/output processing means of a completion of the file expanding process and the amount of after-expansion space, to set the space management information stored in the space management information store memory as after-expansion space management information.

According to another aspect of the present invention, the dynamic file expansion system constructed as above, further comprises:

file expansion completion detecting means for detecting a completion of the file expansion process, when the record input/output process detects an insufficient empty space prior to completing the file expansion; and dynamic file information integrating means for forcibly making the space management information held by the file management system to have an integrity with actual file space management information, when the record input/output processing section detects an inconsistency between the file capacity as held by the file management system and an actual capacity of the file.

According to an embodiment of the file expansion timing detecting means, it variably sets the remaining empty space at which the expansion timing is set, and issues the file expansion request upon detecting that an actual remaining space of the file becomes equal to or less than the registered allocated expansion space.

According to another embodiment of the file expansion timing detecting means, it monitors, instead of setting the remaining empty space at which the expansion timing is set, monitors an amount of increased used space of the file at intervals of a predetermined time period, estimates from the maximum value of the increased used space amount, a time period during which the remaining empty space is entirely used, and issues the file expansion request upon detecting that the estimated time period becomes equal to or less than an estimated time period necessary for file expansion by the registered allocated expansion space.

According to another aspect of the present invention, the file failure recovery system constructed as above, comprises:

file expansion history acquiring means for time sequentially acquiring to a journal file, space management information at file expansion start and completion, when a file is dynamically expanded;

expanded file recovering means for executing again a file expansion process relative to a backup copy of the file generated at an optional time, in accordance file expansion history information after the optional time;

file expansion interception detecting means for detecting an interception of the file expansion process by checking a pair of file expansion start and completion history information; and file expansion inhibiting means for temporarily stopping dynamically expanding the file in response to an interception detection by the file expansion interception detecting means.

The operation of the dynamic file expansion system with the above-described structure will be briefly explained.

When the actual remaining empty space of a file becomes equal to or less than the registered remaining file empty space at which an expansion timing is set, the file is dynamically expanded. If the remaining file empty space at which an expansion timing is set, is Hot registered, the file is dynamically expanded when the actual remaining empty space becomes equal to or less than the registered allocated expansion space. Similarly, an estimated time period when the actual remaining empty space is entirely used, becomes equal to or less than an estimated time period necessary for file expansion by the allocated expansion space, the file is dynamically expanded. In the above manner, a file can be dynamically expanded without intercepting the execution of jobs.

Since the dynamic file expansion is executed while the remaining empty space is present in the file, it is possible to execute a job including record store within the range of the remaining empty space. The dynamic file expansion is asynchronously executed using a process different from a record input/output process continuing the execution of jobs. Space management information is stored separately for the file input/output process and file expansion process. Accordingly, the file input/output processing can be separately executed for both the processes.

Furthermore, since a dynamic expansion timing is determined depending upon the actual remaining empty space, the timing can be determined in the same manner even if file expansion is repeated many times. It is therefore possible to control the allocated expansion space and the remaining empty space at which the expansion timing set, in accordance with the degree of data increase, so as to complete the file expansion started before the space becomes insufficient, immediately before the space actually becomes insufficient.

The dynamic file information integrating means forcibly sets the space management information of the file management system to actual space information. Therefore, it is possible for the file management system to receive the space information of the file expanded by another file management system, without direct communication between both the systems.

Using the time sequentially obtained file expansion history, the file expansion performed after obtaining a backup copy can be correctly recovered even if a file failure occurs. Use of two types of information, file expansion start journal and file expansion completion journal, allows to judge an interception of the file expanding process, if the expansion start journal exists but the expansion completion journal does not exist. In this case, the dynamic file information integrating means makes the space management information to have an integrity with the actual file information, to thereby recover the expansion process interception. If the expansion process interception recovery fails, the file expansion inhibiting means inhibits a dynamic file expansion, allowing job degeneration within the space before expansion.

DESCRIPTION OF THE PREFERRED EMBODIMENTS

Figure 1:
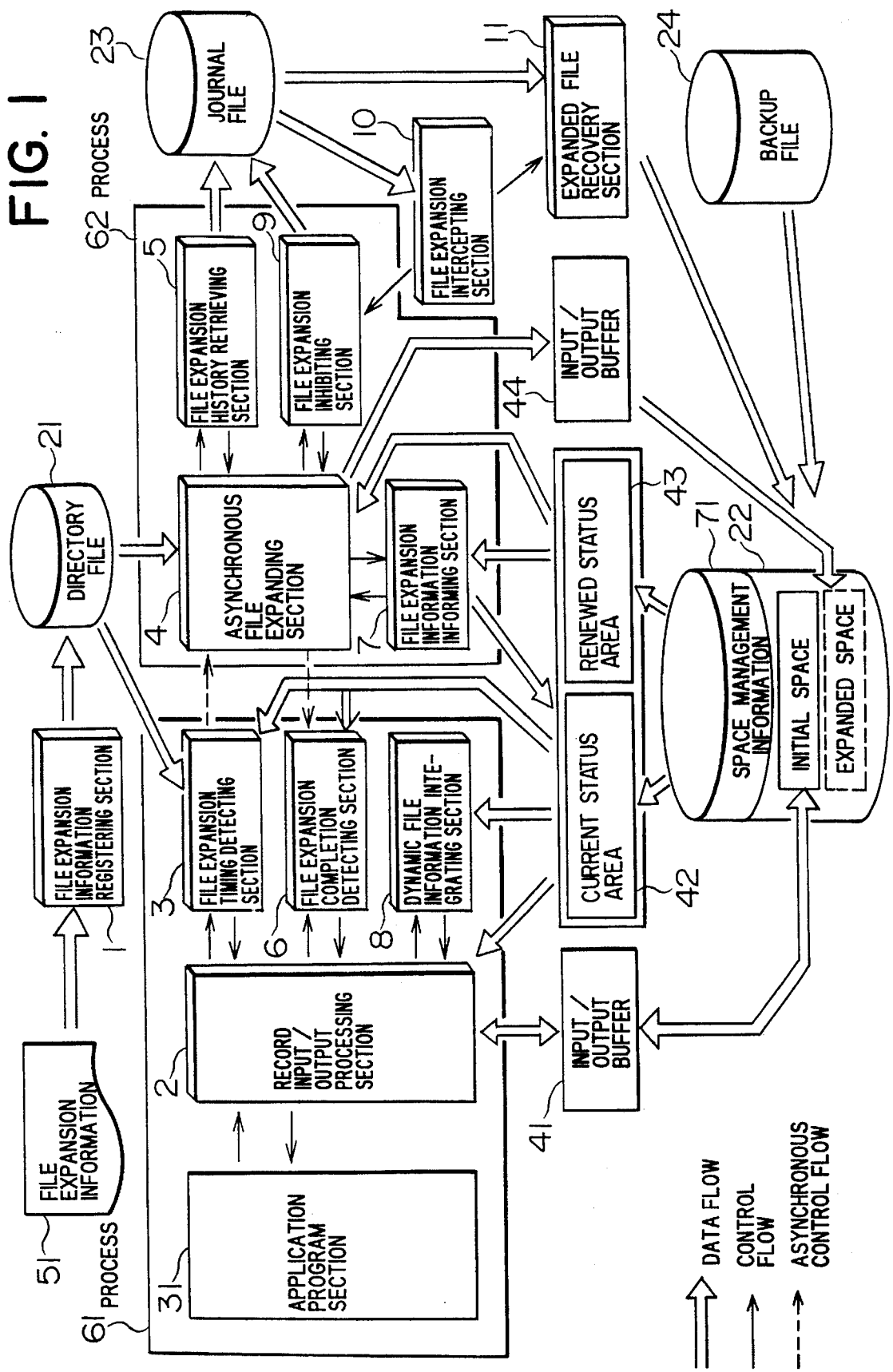
FIG. 1 is a block diagram showing the structure of an embodiment of a dynamic file expansion system according to the present invention.

FIG. 1 shows the structure of a dynamic file expansion system according to an embodiment of the present invention.

Referring to the structure shown in FIG. 1, this dynamic file expansion system has a plurality of file management systems (only one system is shown in FIG. 1), each file being shared by a plurality of file management systems. The dynamic file expansion system includes a file expansion information managing section 1, a record input/output processing section 2, a file expansion timing detecting section 3, an asynchronous file expanding section 4, a file expansion history retrieving section 5, and a file expansion completion detecting section 6. The file expansion information managing section 1 registers file expansion information 1 in a directory file 21, the file expansion information 51 including a file expansion space, a predetermined remaining empty space for starting file expansion, and other information. The record input/output processing section 2 is responsive to a record input/output processing request from an application program section 31, and stores records in a data file 22, renews, deletes, and refers records stored in the file 22. The file expansion timing detecting section 3 detects a timing for expanding the file 22 in accordance with space management information 71 and the file expansion management information 51 in the directory 21. The asynchronous file expanding section 4 is responsive to an instruction from the file expansion timing detecting section 3, and expands the file 22 using a file expansion process 62 different from an application process 61 which may request file expansion. The file expansion process 62 is provided for each file (e.g. 22). A plurality of application processes can access the each file. The file expansion history retrieving section 5 stores an expansion history (journal) of the file 22 in a history file (journal file) 23. The file expansion completion detecting section 6 causes a record store process to stand-by until file expansion is completed, if the empty space is fully used before completion of the file expansion. The dynamic file expansion management system also includes a file expansion information informing section 7, a dynamic file information integrating section 8, a file expansion inhibiting section 9, and a file expansion interception detecting unit 10. The file expansion information informing section 7 transfers space management information of the file expanded by another file management system, to a current status area 42 of its own file management system. Space management information renewed in accordance with an expansion of the file 22 is stored in a renewed status area 43 of the file management system. The dynamic file information integrating section 8 forcibly makes the space management information in the current status area 42 of the file management system to have an integrity with the actual file space management information 71. The file expansion inhibiting section 9 inhibits expansion of the file 22 if a failure of file expansion occurs. The file expansion interception detecting section 10 detects an interception state of file expansion by checking the expansion of the file 22 from the journal file 23. The expanded file recovery section 11 recovers the file 22 from a backup file 24 and journal file 23, when a failure of the file 22 occurs. The term "file" is implemented by a storage device for storing data, such as disks, and semiconductor memories. The data file 22 may be used to include other files 21, 23 and 24.

Next, the operation of each constitutional element of the embodiment system shown in FIG. 1, more specifically, of each function executing section run by programs, will be described with reference to flow charts shown in FIGS. 2 to 14.

Figure 2:
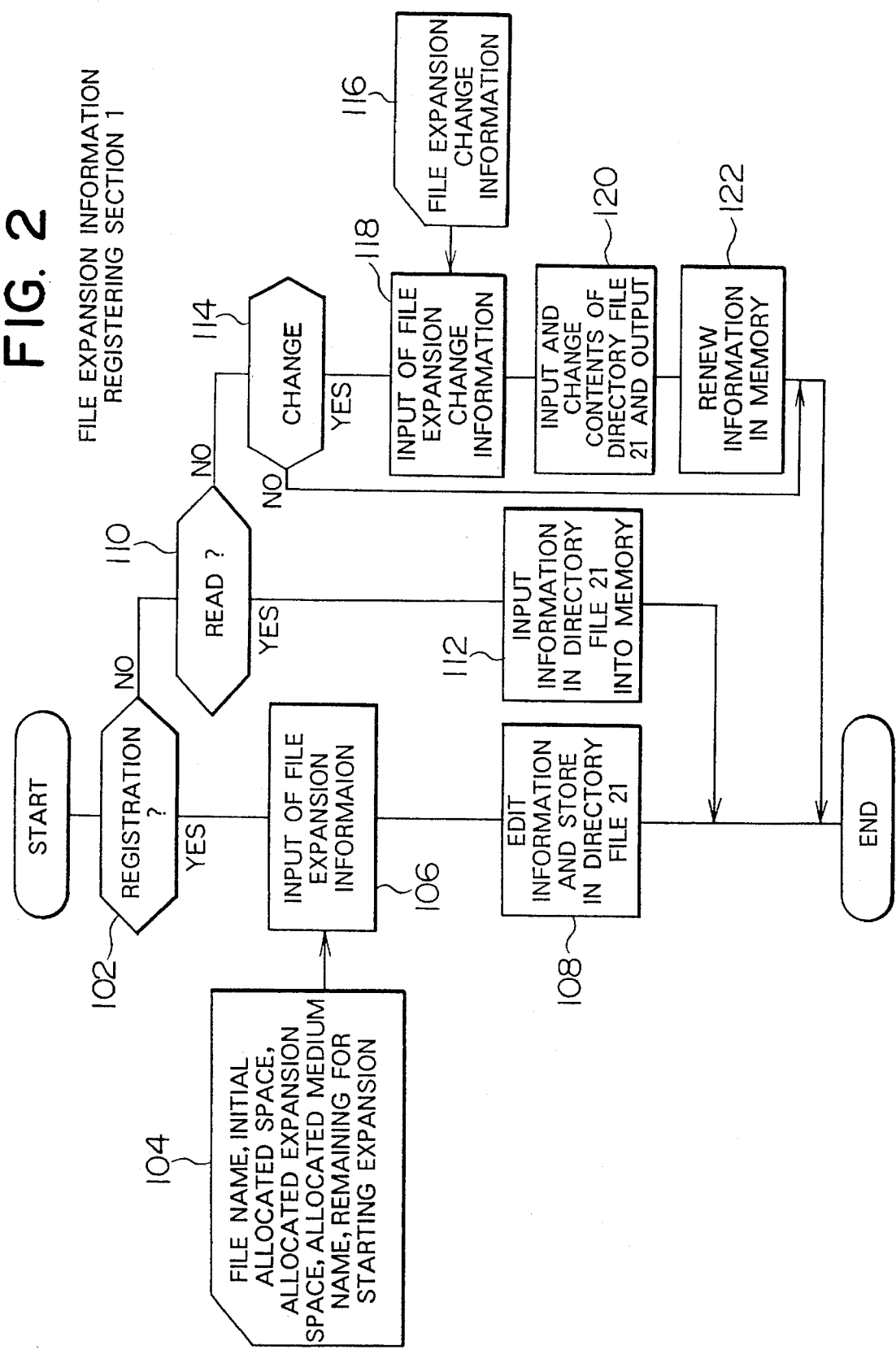
FIG. 2 is a flow chart showing the sequence to be executed by a file expansion information registering section of the embodiment.

FIG. 2 is a flow chart showing the sequence to be executed by the file expansion information registering section 1 of the embodiment. The operation of the file expansion information managing section 1 will be described with reference to the flow chart of FIG. 1. In registering the file expansion information 51 (step 102), the file expansion information 51 (stored at 104) is inputted, the information including a file name, an initial allocation space, an allocated expansion space, a store medium name, a remaining empty space for starting file expansion, and the like. The inputted file expansion information is edited and outputted to the directory file 21 (step 108). In reading the file expansion information (step 110), the file expansion information in the directory file 21 is inputted to a memory (not shown) which can be accessed from both the timing detecting section 3 and expanding section 4 (step 112). In changing the file expansion information (step 114), file change information is inputted to the file expansion information managing section 1 (step 118). Next, the file expansion information is read from the directory file 21 to change the contents using the file change information, and thereafter it is outputted to the directory file 21 (step 120). At this time, the file expansion information stored in the memory is also renewed (step 122).

Figure 3:
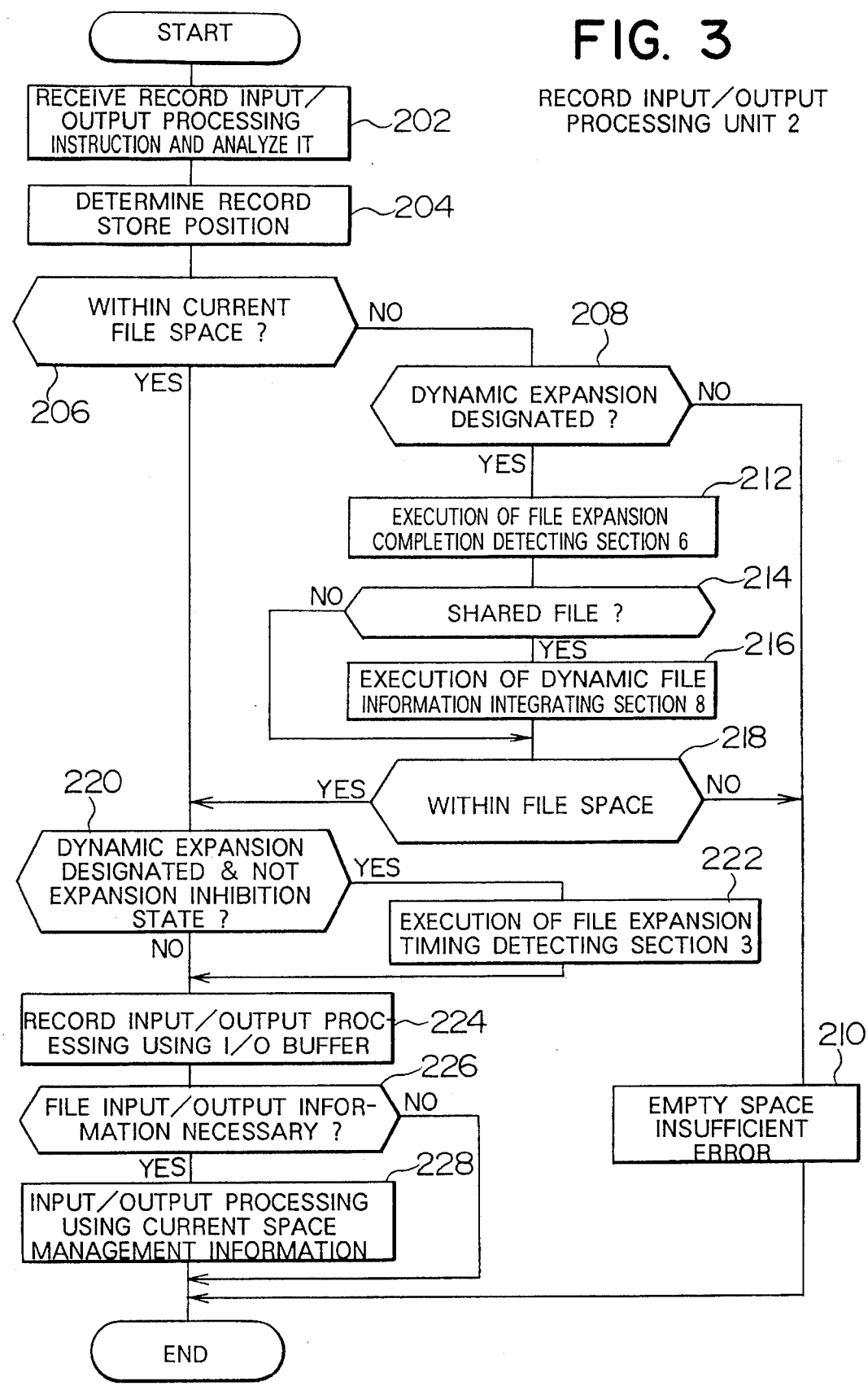
FIG. 3 is a flow chart showing the sequence to be executed by a record input/output processing section of the embodiment.

FIG. 3 is a flow chart showing the sequence to be executed by the record input/output processing section 2 of the embodiment. The operation of the record input/output processing section 2 will be described with reference to the flow chart of FIG. 3. When a record input/output instruction is issued from the application program section 31, the record input/output section 2 receives the instruction and analyzes it (step 202) to determine the record store position within the file (step 204). Whether the record store position is within the current file space or not, is checked from the space management information in the current status area 42 of the associated file management system (step 206). If it is judged that the record store position is outside of the current file space, it is checked if the file 22 has been expanded. At this check, it is first checked from the information registered in the directory file 21 whether the file 22 is to be dynamically expanded or not (step 208). If not, an empty space insufficient error is issued (step 210). If the file is to be dynamically expanded, a completion of file expansion outputted upon execution of the file expansion completion waiting section 6 is waited (step 212). If the file 22 is a file shared by a plurality of file management systems (step 212), the dynamic file information integrating section 8 picks up the space management information of the file expanded by another file management system as the space management information of its own file management system (step 216). If the file space becomes large and the record store position becomes within the file space (step 218), the wait operation by the waiting section 6 is released, and the record input/output processing resumes. If the file is a file to be dynamically expanded and it is not in an expansion inhibited state (step 220), it is checked upon execution of the file expansion timing detecting section 3 whether the file 22 is at an expansion timing (step 222). Next, record input/output processing is performed using an input/output buffer 41 (step 224). At this time, if input/output information for the file 22 is necessary, the existing space management information in the current status area 42 is used to perform the record input/output processing (step 228).

Figure 4:
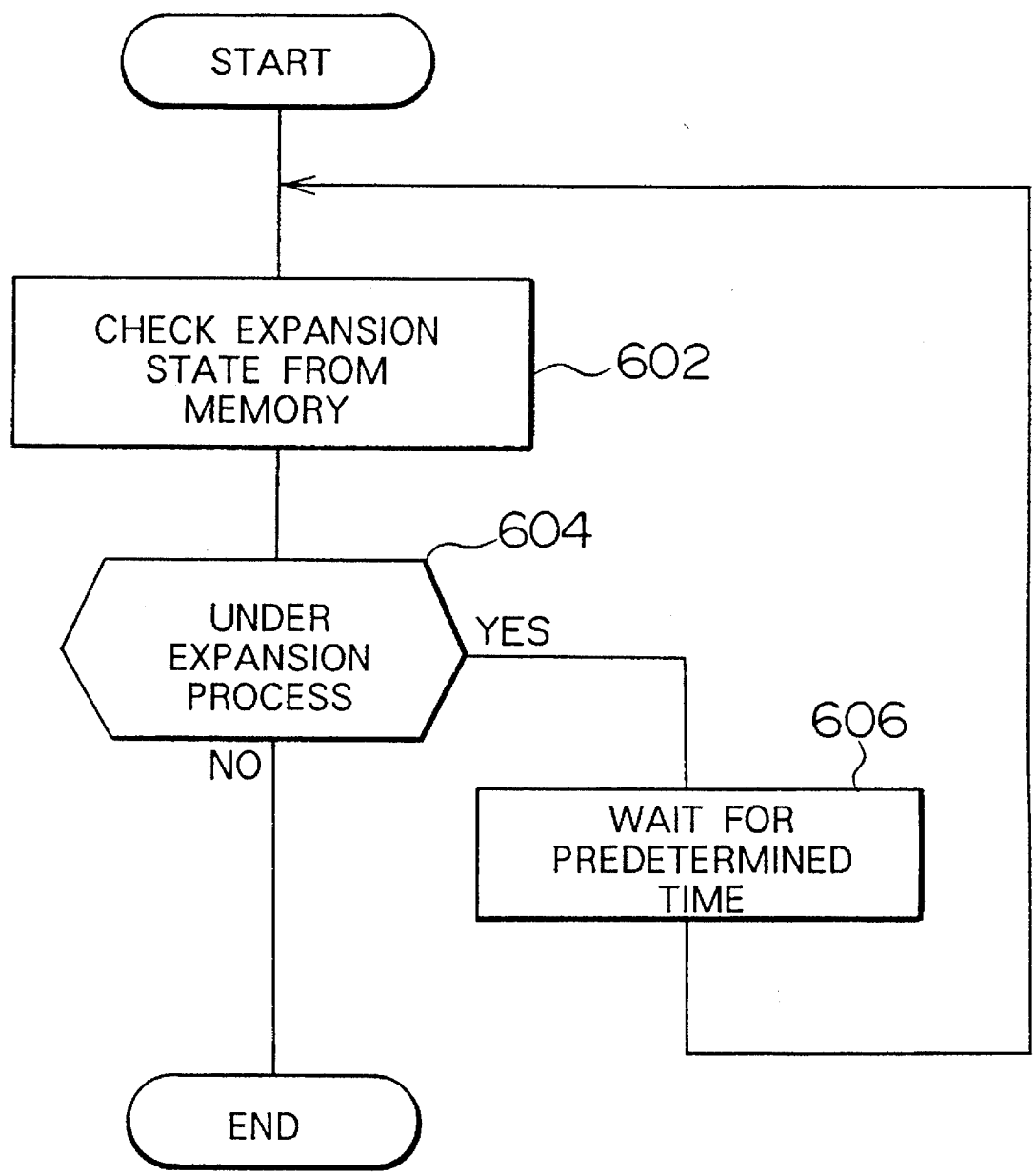
FIG. 4 is a flow chart showing the sequence to be executed by a file expansion completion detecting section of the embodiment.

FIG. 4 is a flow chart showing the sequence to be executed by the file expansion completion detecting section 6 of the embodiment. The operation of the file expansion completion detecting section 6 will be described with reference to the flow chart of FIG. 4. First, referring to a memory storing the space management information of the file 22, the file expansion state is checked (step 602). If it is judged that the file 22 is under expansion processing (step 604), after a predetermined time (step 606) the check is again performed (step 602). These steps are repeated until the expansion of the file 22 is completed, during which the record input/output processing for the file 22 is suspended. When an expansion completion is detected, a record input/output processing enable signal is issued.

Figure 5:
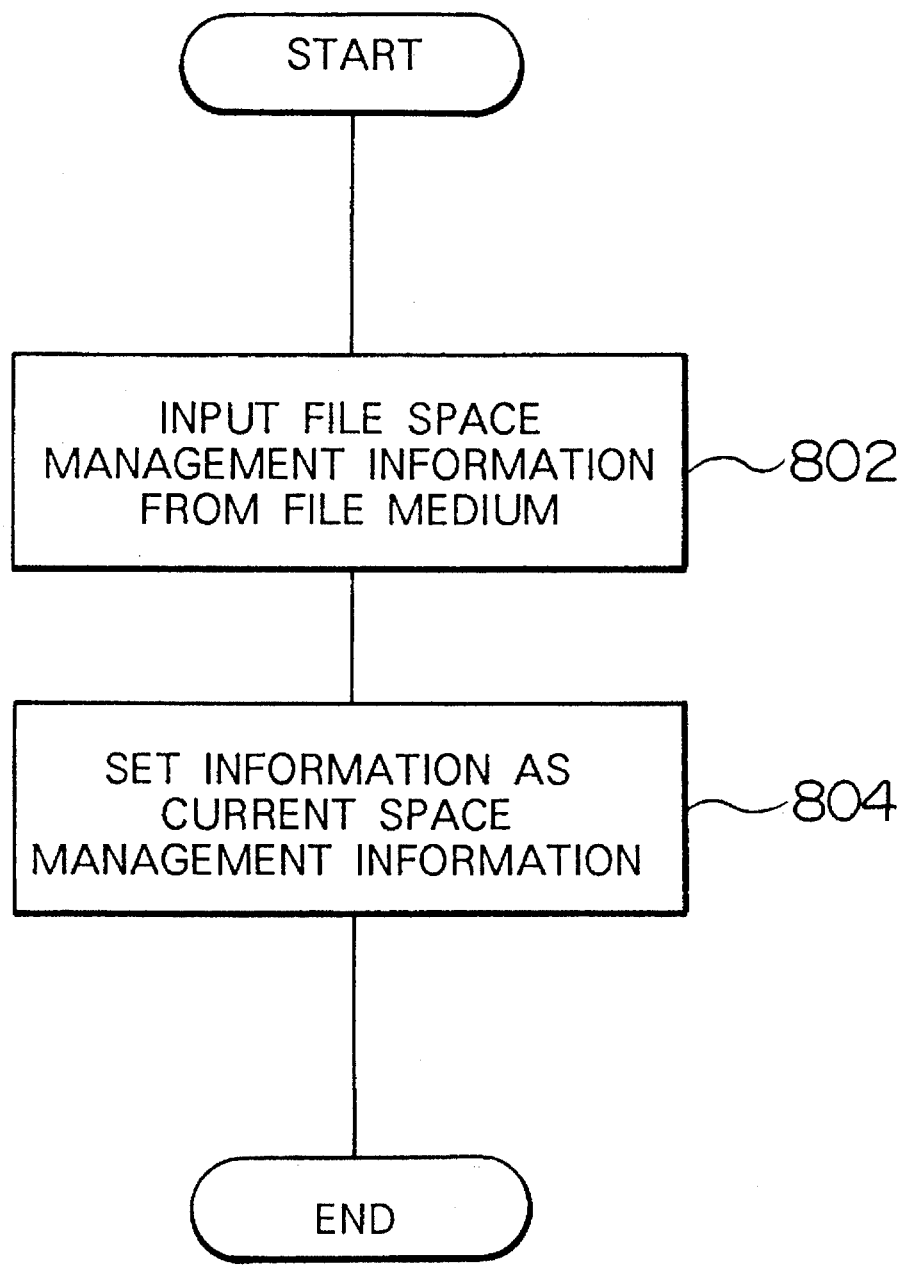
FIG. 5 is a flow chart showing the sequence to be executed by a dynamic file information integrating section of the embodiment.

FIG. 5 is a flow chart showing the sequence to be executed by the dynamic file information integrating section 8 of the embodiment. The operation of the dynamic file information integrating section 8 will be described with reference to the flow chart of FIG. 5. The space management information 71 stored in the file medium of the file 22 is inputted to in the renewed status area 43 of a memory used for renewed space management information (step 802). Next, the inputted space management information is set as the existing space management information in the area 42 logically by memory switching.

Figure 6:
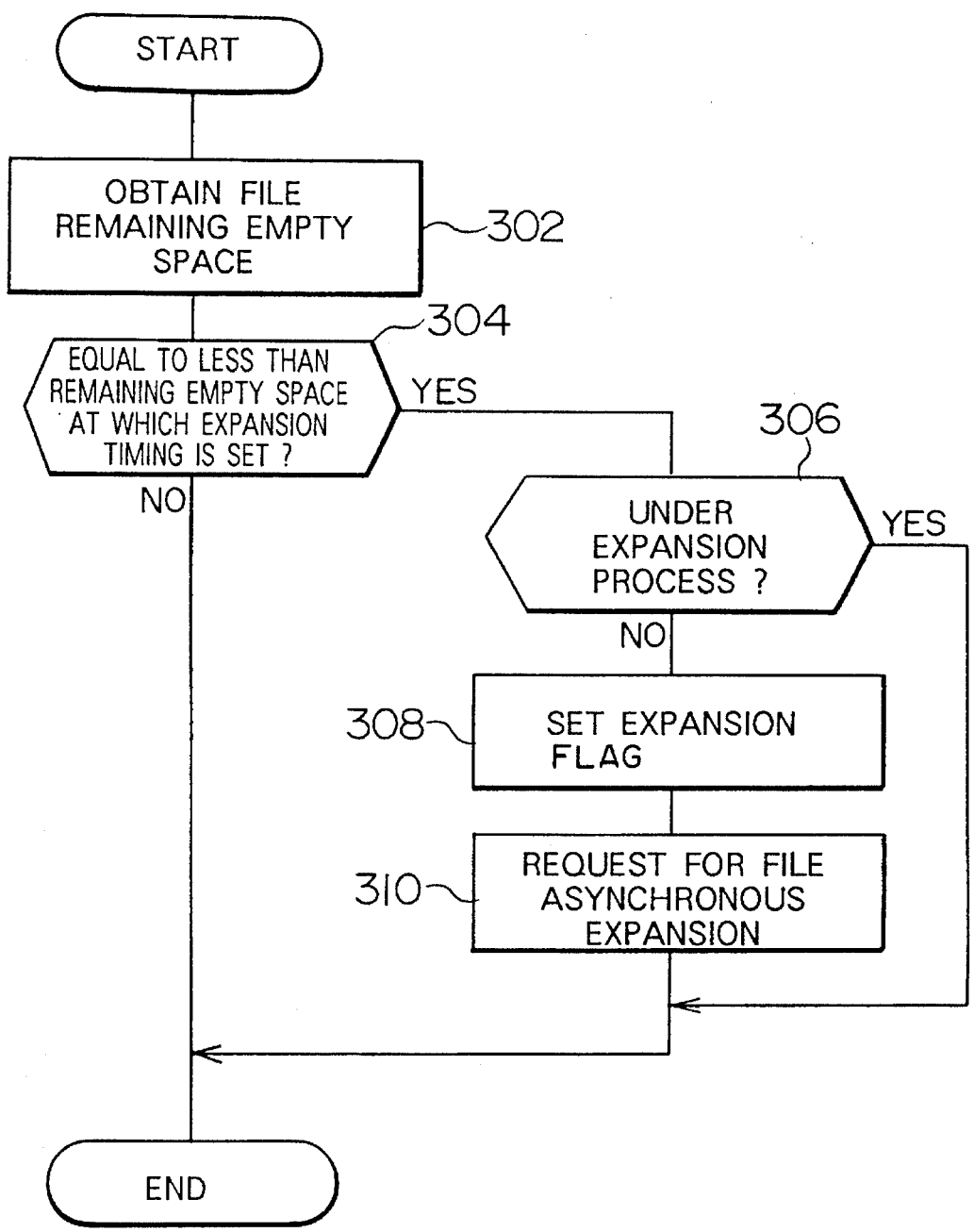
FIG. 6 is a flow chart showing a first example of the sequence to be executed by a file expansion timing detecting section of the embodiment.

FIG. 6 is a flow chart showing a first example of the sequence to be executed by the file expansion timing detecting section 3 of the embodiment. The first example of the operation of the file expansion timing detecting section 3 will be described with reference to the flow chart of FIG. 6. First, the empty space of the file 22 is checked from the current space management information 42 (step 302). If the empty space is equal to or less than a predetermined remaining empty space at which an expansion timing is set (step 304), it is checked whether the file 22 is under expansion processing (step 306). If not under expansion processing, the expansion flag for the file 22 is set in the file management system memory (step 308). In accordance with this information, an expansion request is issued to the asynchronous file expanding section 4 (step 310).

Figure 7:
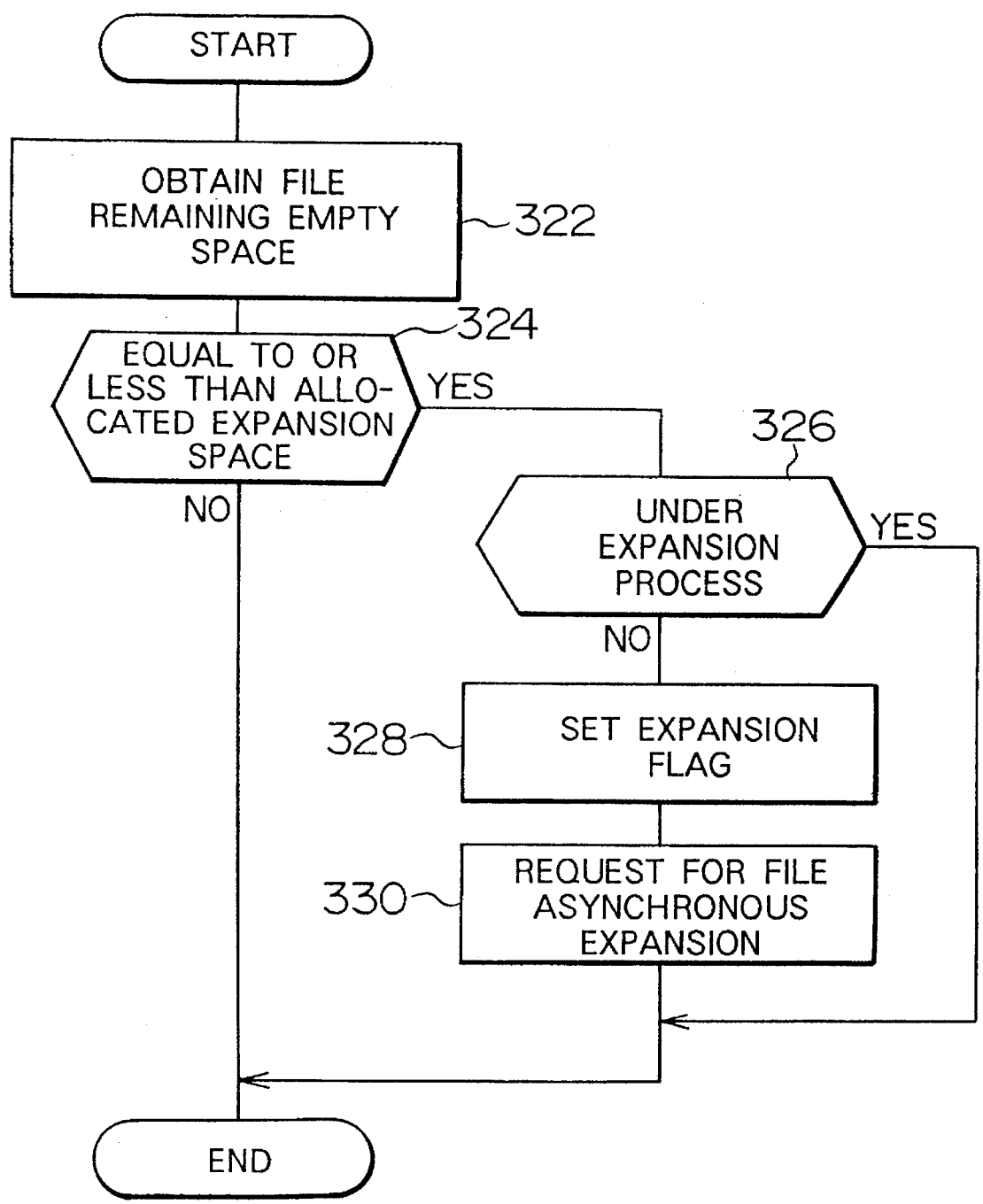
FIG. 7 is a flow chart showing a second example of the sequence to be executed by the file expansion timing detecting section of the embodiment.

FIG. 7 is a flow chart showing a second example of the sequence to be executed by the file expansion timing detecting section 3 of the embodiment. The second example of the operation of the file expansion timing detecting section 3 will be described with reference to the flow chart of FIG. 7. First, the empty space of the file 22 is checked from the space management information in the current status area 42 (step 324). If the empty space is equal to or less than an allocated expansion space (step 324), it is checked whether the file 22 is under expansion processing (step 326). If not under expansion processing, an expansion flag for the file 22 is set in the memory (step 328). Thereafter, an expansion request is issued to the asynchronous file expanding section 4 (step 330).

Figure 8:
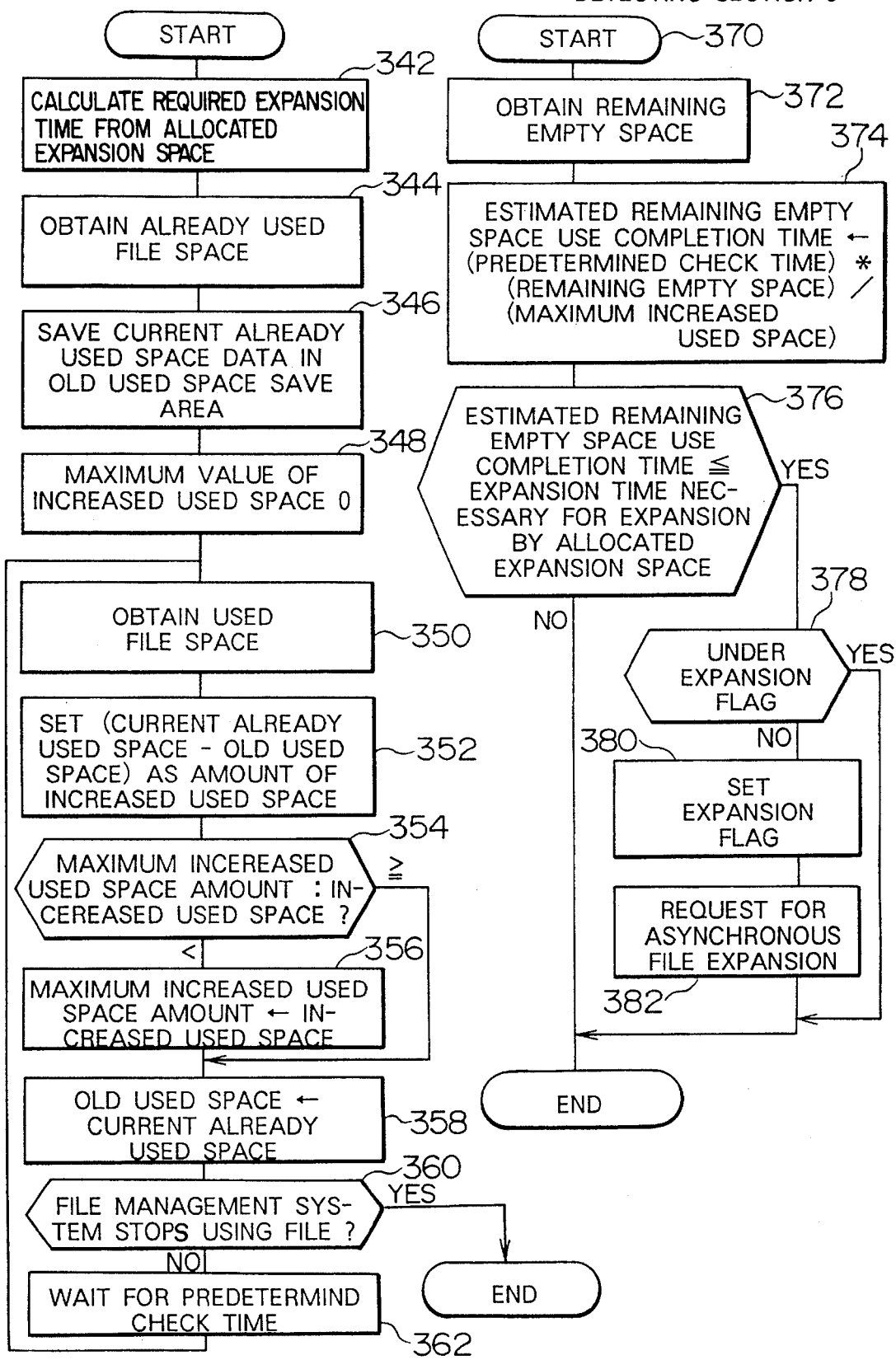
FIG. 8 is a flow chart showing a third example of the sequence to be executed by the file expansion timing detecting section of the embodiment.

FIG. 8 is a flow chart showing a third example of the sequence to be executed by the file expansion timing detecting section 3 of the embodiment. The third example of the operation of the file expansion timing detecting section 3 will be described with reference to the flow chart of FIG. 7. First, a time required for file expansion is calculated from the allocated expansion space (step 342). Next, obtained is the already used space of the file 22 (step 344). Then, data representing the already used space is saved in an old used space save area.(step 346). The maximum value of increased used space is initialized to "0" (step 348). A current already used space of the file 22 is obtained (step 350). Then, a difference (a–b) is set as the amount of increased used space, where a represents the current already used space, and b represents the old used space (step 352). If the amount of increased used space exceeds the maximum value of increased used space (step 354), the amount of increased used space is set as the maximum value of increased used space (step 356). Next, the current already used space is set as the old used space (step 358). Until the file management system terminates an operation on the file (step 360), the control stops during a predetermined check period and repeats the steps starting from the step 350 for obtaining the current already used space. In this manner, the maximum value of increased used space among respective check periods is always stored.

In detecting a file expansion timing (starting from step 370), first the empty space of the file 22 is obtained (step 372). A time period t*(c/d) is set as an estimated use completion time period of the remaining empty space, where t is the predetermined check period, c is the remaining empty space, and d is the maximum value of increased space (step 374). When the estimated use completion time period of the remaining empty space becomes equal to or less than the expansion time required for file expansion by the allocated expansion space (step 376), it is checked if the file 22 is under expansion processing (step 378). If not, the expansion flag is set in the memory (step 328). Thereafter, an expansion request is issued to the asynchronous file expanding section 4 (step 382).

Figure 9:
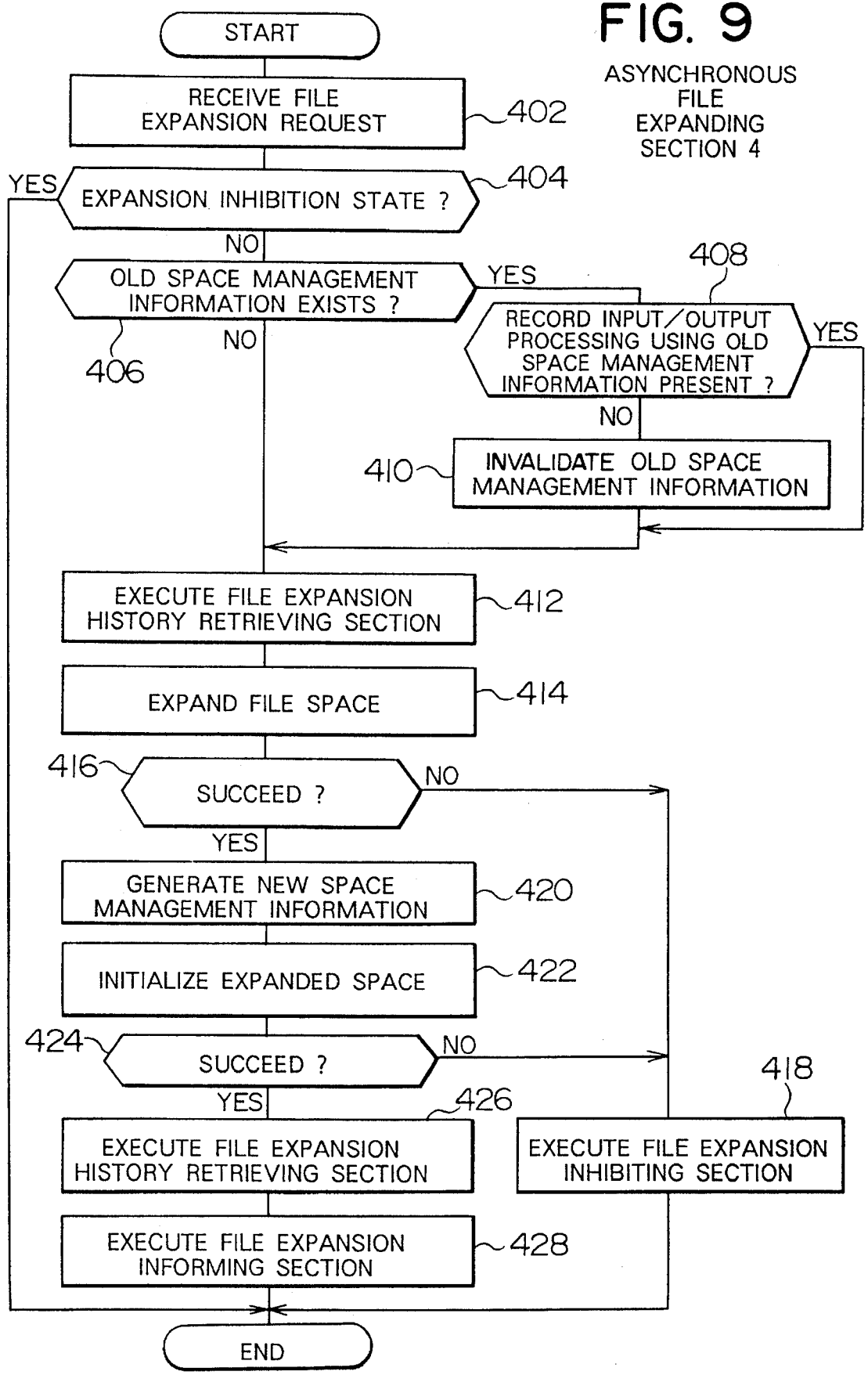
FIG. 9 is a flow chart showing the sequence to be executed by an asynchronous file expanding section of the embodiment.

FIG. 9 is a flow chart showing the sequence to be executed by the asynchronous file expanding section 4 of the embodiment. The operation of the asynchronous file expanding section 4 will be described with reference to the flow chart of FIG. 9. Upon reception of a file expansion request (step 402), this section refers to the file expansion inhibiting section 9 to check whether the file 22 is in an expansion inhibition state (step 404). If in this state, no operation is executed to terminate the control. If not, it is checked whether there is at least one old space management information in the current status area 42 (step 406). If there is the old space management information, it is checked if any record input/output processing in process 61 uses the old space management information (step 408). If no record input/output processing uses the information, it is released or invalidated (step 410). Next, a file expansion start journal is put into journal file 23 via the file expansion history retrieving section 5 (step 412). The file 22 is then expanded by the allocated expansion space designated by the file expansion information 51 registered in directory file 21 under control of the expanding section 4 (step 414). If the file expansion fails (step 416), the file 22 is set to an expansion inhibition state by the file expansion inhibiting section 9 (step 418). If the file expansion succeeds (step 416), a renewed space management information regarding the expanded file is generated and stored in the renewed status area 43 of the space management information store memory (step 420). Thereafter, the expanded space is initialized (format/write) using a dedicated input/output buffer 44 (step 422). If the initialization of the expanded space fails (step 424), the file 22 is set to the file expansion inhibition state by the file expansion inhibiting section 9 (step 418). Next, a file expansion completion journal is put into journal file 23 via the file expansion history retrieving section 5 (step 426). The file expansion information informing section 7 logically renews the current status area 42 on the basis of information in the renewed status area 43.

Figure 10:
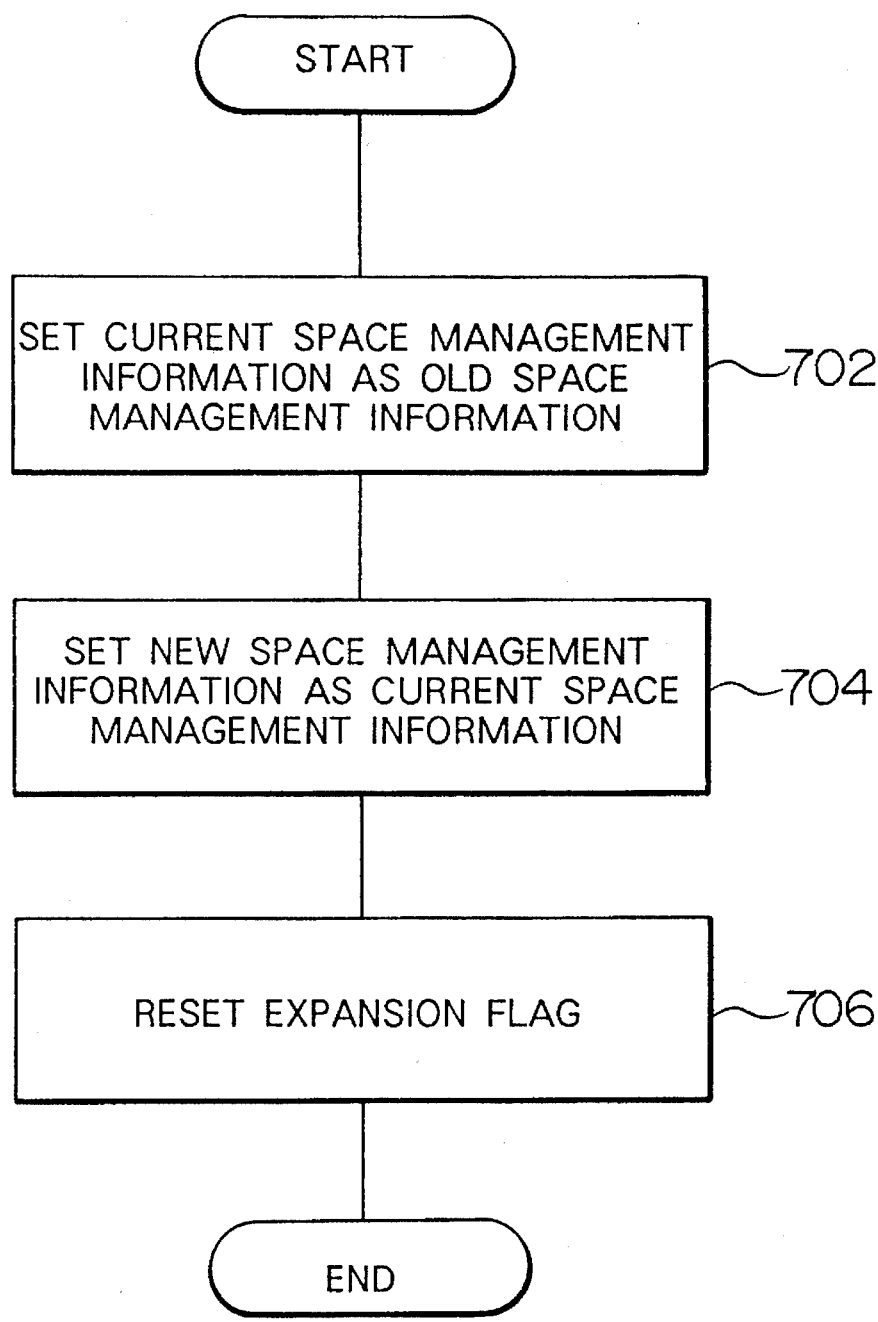
FIG. 10 is a flow chart showing the sequence to be executed by a file expansion information informing section of the embodiment.

FIG. 10 is a flow chart showing the sequence to be executed by the file expansion information informing section 7 of the embodiment. The operation of the file expansion information informing section 7 will be described with reference to the flow chart of FIG. 10. First, the current space management information held in the current status area 42 is changed to old space management information.(step 702), and new space management information held in the renewed status area 43 is logically transferred to the current status area 42 (step 704). Lastly, the expansion flag in the memory is reset (step 706).

Figure 11:
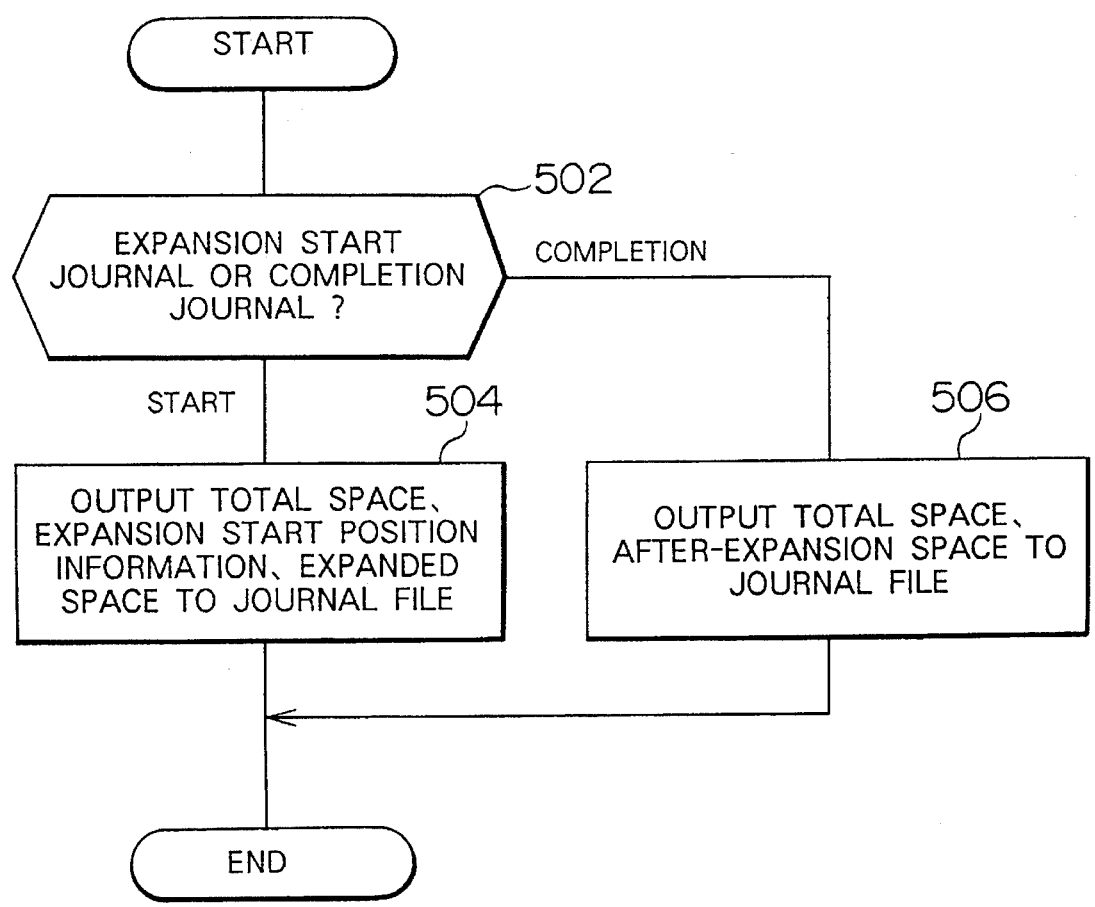
FIG. 11 is a flow chart showing the sequence to be executed by a file expansion history retrieving section of the embodiment.

FIG. 11 is a flow chart showing the sequence to be executed by the file expansion history retrieving section 5 of the embodiment. The operation of the file expansion history retrieving section 5 will be described with reference to the flow chart of FIG. 11. It is first checked whether a request from the asynchronous file expanding section 4 is for the file expansion start journal or the file expansion completion journal (step 502). If for the file expansion start journal, the total space of the file, expansion start position information, and an expansion space, are outputted to the journal file 23 (step 504). If for the file expansion completion journal, the total space of the file and an amount of after-expansion space are outputted to the journal file 23 (step 506).

Figure 12:
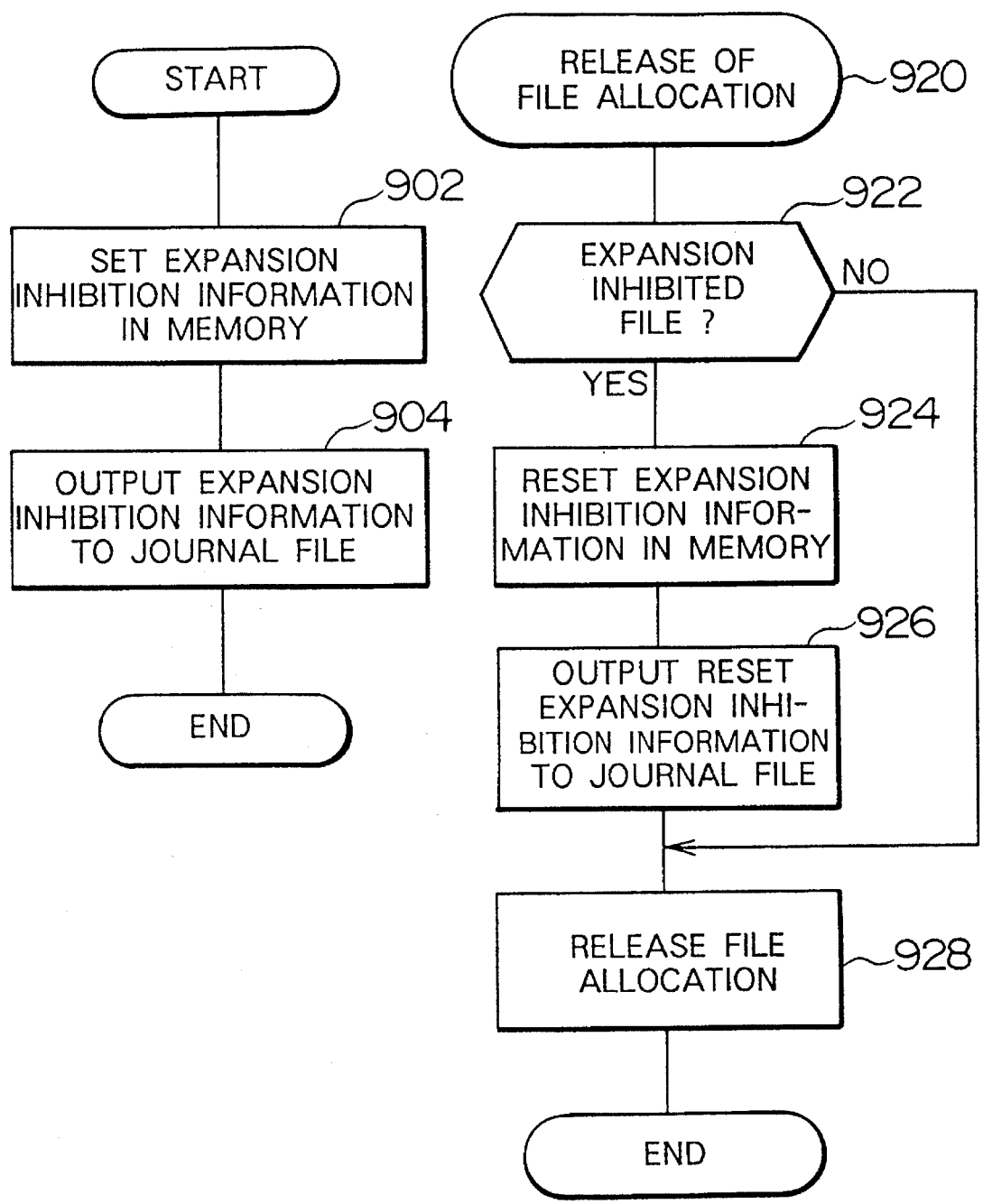
FIG. 12 is a flow chart showing the sequence to be executed by a file expansion inhibiting section of the embodiment.

FIG. 12 is a flow chart showing the sequence to be executed by the file expansion inhibiting section 9 of the embodiment. The operation of the file expansion inhibiting section 9 will be described with reference to the flow chart of FIG. 12. For inhibiting file expansion, expansion inhibition information is set in a memory accessible by the inhibiting section 9 (step 902). Next, the expansion inhibition information is outputted to the journal file 23 (step 904). A file expansion inhibition state is released at the same time when a file space allocation is released. In releasing a file space allocation (step 920), after the expansion inhibition information in the memory is reset (step 924), release information of the expansion inhibition state is outputted to the journal file 23 (step 926) to then release a file space allocation (step 928).

Figure 13:
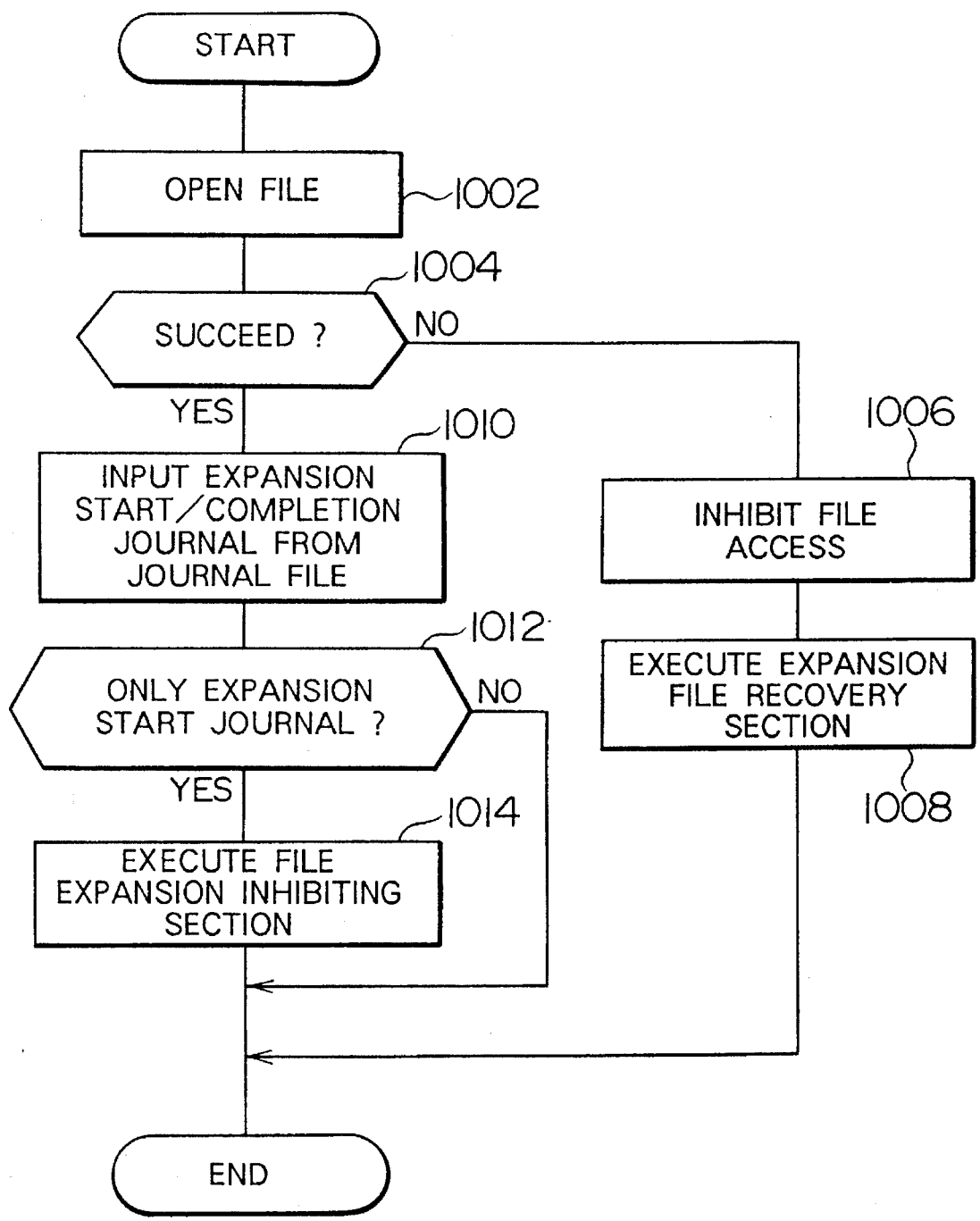
FIG. 13 is a flow chart showing the sequence to be executed by a file expansion interception detecting section of the embodiment.

FIG. 13 is a flow chart showing the sequence to be executed by the file expansion interception detecting section 10 of the embodiment. The operation of the file expansion interception detecting section 10 will be described with reference to the flow chart of FIG. 13. At the restart operation after abnormal termination of the file management system, the file 22 is first tried to open (step 1002). If the open process fails (step 1004), the file 22 is set to an access inhibition state (step 1006), and the file 22 is recovered upon execution of the expanded file recovery section 11 (step 1008). If the open process succeeds (step 1004), the file expansion start journal and file expansion completion journal are received from the journal file 23 (step 1010). If a file expansion start journal is retrieved but a file expansion completion journal is not retrieved from the journal file 23 (step 1012), it is determined that the expansion processing has been intercepted. The file expansion inhibiting section 9 then causes the file 22 to be set to the expansion inhibition state (step 1014).

Figure 14:
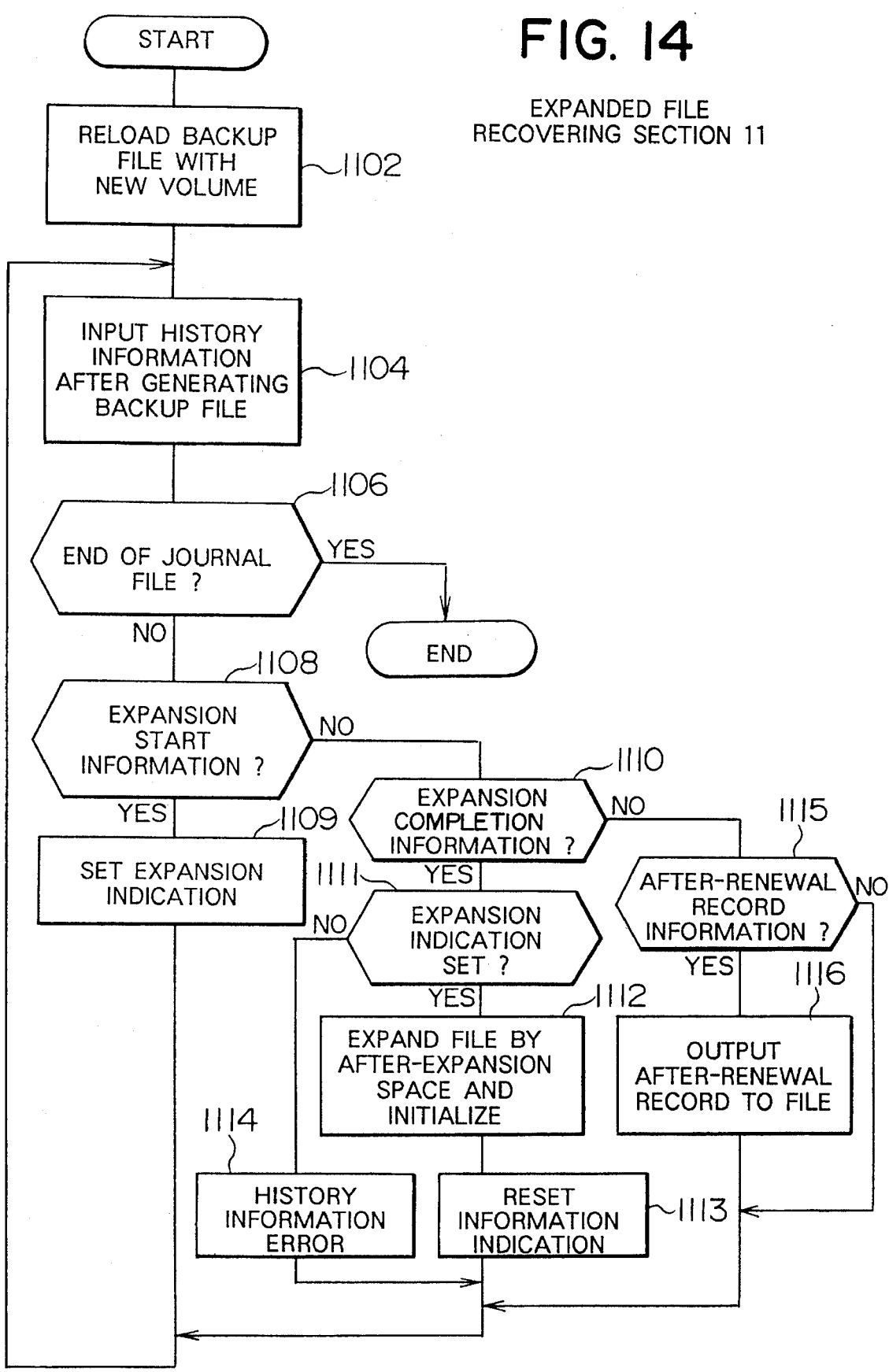
FIG. 14 is a flow chart showing the sequence to be executed by an expanded file recovering section of the embodiment.

FIG. 14 is a flow chart showing the sequence to be executed by the expanded file recovering section 11 of the embodiment. The operation of the expanded file recovering section 11 will be described with reference to the flow chart of FIG. 14. First, the backup file 24 is reloaded giving a new volume (step 1102). Next, history information in the journal file 23 up to the current time after generating the backup file, is sequentially inputted (step 1104). If the inputted history information is file expansion start information (step 1108), an expansion indication is set (step 1109). If the inputted history information is file expansion completion information (step 1110) and an expansion indication is not being set (step 1111), the file 22 is expanded by the amount of after-expansion space, and the expanded space is initialized (step 1112) to thereafter reset the expansion indication (step 1113). On the other hand, if the expansion indication is not being set (step 1111), a history information error is issued (step 1114). If the inputted history information is after-renewal record information (step 1115), this after-renewal record is outputted to the file 22 (step 1116).

Systems according to the above embodiment are sold by HITACHI, LTD. The systems are disclosed in Program Products VOS3, Data Management Systems XDM/SD E- 2, particularly in Nos.6180-601-30, 6180-6-620-30, 6180-6-625-30, 6180-6-628-30, and 6180-6-629-30, and VOS3-VSAM, No.6180-3-180, the contents of which are herein incorporated by reference.

As described so far, according to the present invention, a file can be expanded without intercepting on-line jobs and adversely affecting them. Furthermore, a file can be dynamically expanded while retaining an optimum efficiency of store medium space.

Still further, a file shared by a plurality of file management systems can be dynamically expanded without any contradiction between the systems.

In addition, file recovery and job degradation are possible when a failure of a dynamically expanded file or dynamic file expansion itself occurs.

Further, it is not necessary to correctly estimate the total necessary space of a file when executing a store process for storing a great amount of data in the file, a reloading process of data in the file, or a file move process.

What is claimed is:

1. A dynamic file expansion method for a file management system providing efficient operations of storing records in a file, renewing, deleting, and referring to records stored in the file, said dynamic file expansion method comprising the steps of:

registering information of an allocated expansion space to be added to said file upon occurrence of insufficient space therein, and registering information of a remaining empty space of said file whereby an expansion timing indicating a need for file expansion is set;

detecting whether actual remaining space of said file becomes equal to or less than said registered remaining empty space at which said expansion timing is set, to issue a file expansion request;

in response to said file expansion request, expanding a file by generating and holding new space management information in accordance with said registered allocated expansion space information, expanding a space to the file, initializing said expanded space to the file in parallel with record input/output processing relative to the already existing space and interrupting said second input/output processing before said file expansion;

during execution of said file expanding step, executing said record input/output processing relative to said already existing space by using old before expansion space management information, in accordance with a record input/output process;

informing said record input/output process of a completion of said file expanding process and the amount of after-expansion space to logically set said held space management information as after-expansion space management information;

resuming said record input/output process after said file expanding process, when said record input/output process detects an insufficient empty space prior to completing the file expansion; and matching space management information for a particular file management system with actual file space management information after a file expansion executed by another file management system, when an inconsistency is detected between the file capacity managed by said file management system and an actual capacity of said file.

2. A dynamic file expansion method for a file management system providing efficient operations of storing records in a file, renewing, deleting, and referring to records stored in the file, said dynamic file expansion method comprising the steps of:

registering information of an allocated expansion space to be added to said file upon occurrence of insufficient space therein, and registering information of a remaining empty space of said file whereby an expansion timing indicating a need for file expansion is set;

detecting whether actual remaining space of said file becomes equal to or less than said registered remaining empty space at which said expansion timing is set, to issue a file expansion request;

in response to said file expansion request, expanding a file by generating and holding new space management information in accordance with said registered allocated expansion space information, expanding a space to the file, initializing said expanded space to the file in parallel with record input/output processing relative to the already existing space and interrupting said second input/output processing before said file expansion;

during execution of said file expanding step, executing said record input/output processing relative to said already existing space by using old before expansion space management information, in accordance with a record input/output process; and informing said record input/output process of a completion of said file expanding process and the amount of after-expansion space to logically set said held space management information as after-expansion space management information;

wherein said detecting step monitors, without setting said remaining empty space at which said expansion timing is set, an amount of increased used space of said file at intervals of a predetermined time period, estimates from a maximum value of said increased used space amount, a time period during which said remaining empty space is entirely used, and issues said file expansion request upon detecting that said estimated time period becomes equal to or less than a time period necessary for file expansion by said registered allocated expansion space.

3. A dynamic file expansion system for a file management system providing efficient operations of storing records in a file, renewing, deleting, and referring records stored in the file, said dynamic file expansion system comprising:

a file expansion information register for registering information of an allocated expansion space to be added to said file upon occurrence of insufficient space therein, and registering information of a remaining empty space of said file whereby an expansion timing indicating a need for file expansion is set;

a file expansion timing detector for detecting whether actual remaining space of said file becomes equal to or less than said registered remaining empty space at which said expansion timing is set to issue a file expansion request;

an asynchronos file expander, responsive to said file expansion request issued from said file expansion timing detector, for expanding a file by generating and storing in a space management information store memory, new space management information in accordance with said registered allocated expansion space information, executing a space expanding process and an initializing process to said file, in parallel with a record input/output process and interrupting said record input/output process before file expansion;

a record input/output processor for executing said record input/output process relative to said already existing space by using old before expansion space management information;

a file expansion information informer for informing said record input/output processor of a completion of the file expanding process and the amount of after-expansion space, to logical set said space management information stored in said memory as after expansion space management information;

a file expansion completion detector for resuming said record input/output process after said file expansion, when said record input/output process detects an insufficient empty space prior to completing said file expansion; and a dynamic file information integrator for matching space management information for a particular file management system with actual file space management information after a file expansion executed by another file management system, when an inconsistency is detected between the file capacity as said space management information given to said file management system and an actual capacity of said file.

4. A dynamic file expansion method for a file management system providing efficient operations of storing records in a file, renewing, deleting, and referring records stored in the file, said dynamic file expansion method comprising the steps of:

registering information of an allocated expansion space to be added to said file upon occurrence of insufficient space therein, and registering information of a remaining empty space of said file whereby an expansion timing indicated a need for file expansion is set;

detecting whether actual remaining space of said file becomes equal to or less than said registered remaining empty space at which said expansion timing is set, to issue a file expansion request;

in response to said file expansion request, expanding a file by generating and holding new space management information in accordance with said registered allocated expansion space information, expanding a space to the file, and initializing said expanded space to the file, in parallel with record input/output processing relative to the already existing space before said file expansion;

during execution of said file expanding step, executing said record input/output processing relative to said already existing space by using old before expansion space management information, in accordance with a record input/output process;

informing said record input/output process of a completion of said file expanding step and the amount of after-expansion space, to logically set said held space management information as after-expansion space management information;

time sequentially acquiring to a journal file, space management information at file expansion start and completion, when a file is dynamically expanded;

executing again the file expanding step relative to a backup copy of said file generated at an optional time, in accordance with file expansion history information, after said optional time, recovered from said journal file;

detecting an interception of said file expanding step by checking a pair of file expansion start and completion history information obtained from said journal file; and temporarily inhibiting dynamically expanding said file in response to detection of said interception.

5. A dynamic file expansion system for a file management system providing efficient operations of storing records in a file, renewing, deleting, and referring records stored in the file, said dynamic file expansion system comprising:

a file expansion information register for registering information of an allocated expansion space to be added to said file upon occurrence of insufficient space therein, and registering information of a remaining empty space of said file whereby an expansion timing indicating a need for file expansion is set;

a file expansion timing detector for detecting whether actual remaining space of said file becomes equal to or less than said registered remaining empty space at which said expansion timing is set to issue a file expansion request;

an asynchronous file expander, responsive to said file expansion request issued from said file expansion timing detector, for expanding a file by generating and storing in a space management information store memory, new space management information in accordance with said registered allocated expansion space information, and executing a space expanding process and an initializing process to said file, in parallel with a record input/output process;

a record input/output processor for executing said record input/output process relative to said already existing space by using old before expansion space management information;

a file expansion information informer for informing said record input/output processor of a completion of the file expanding process and the amount of after-expansion space, to logically set said space management information stored in said memory as after expansion space management information;

a file expansion history acquiring unit, having a journal file, for time sequentially acquiring to said journal file space management information at file expansion start and completion, when a file is dynamically expanded;

an expanded file recover unit for executing again a file expansion process relative to a backup copy of said file generated at an optional time, in accordance file expansion history information, after said optional time, recovered from said journal file;

a file expansion interception detector for detecting an interception of the file expansion process by checking a pair of file expansion start and completion history information obtained from said journal file; and a file expansion inhibitor for temporarily stopping dynamic expansion of said file in accordance with the check result by said file expansion interception detector.

* * * * *